United States Patent
White, II (10) Patent No.: US 6,198,386 B1
(45) Date of Patent: Mar. 6, 2001

(54) VEHICLE GUIDANCE ASSEMBLY AND METHOD

(76) Inventor: Locke White, II, 501 8th St., Radford, VA (US) 24141

(*) Notice: Subject to any disclaimer, the term of this patent is extended or adjusted under 35 U.S.C. 154(b) by 0 days.

(21) Appl. No.: 09/436,555

(22) Filed: Nov. 9, 1999

Related U.S. Application Data (63) Continuation of application No. 09/165,980, filed on Oct. 2, 1998, now abandoned.

(51) Int. Cl.$^7$ ........................................................ B60Q 1/00
(52) U.S. Cl. .......................... 340/435; 340/436; 340/961; 33/264
(58) Field of Search ...................................... 340/961, 933, 340/932.2, 435, 436; 701/301; 33/264; 404/94

(56) References Cited

U.S. PATENT DOCUMENTS

| | | | |
|---|---|---|---|
| 2,360,368 | 10/1944 | Rubissow | 33/264 |
| 2,374,956 | 5/1945 | Rubissow | 356/138 |
| 4,016,653 * | 4/1977 | Bartlett | 33/264 |
| 4,677,753 | 7/1987 | Loggers | 33/264 |
| 4,823,471 * | 4/1989 | Van Schaack | 33/264 |
| 4,941,263 * | 7/1990 | Hirshberg | 33/264 |
| 4,973,155 | 11/1990 | Masuda | 356/121 |
| 5,052,113 * | 10/1991 | Aquino | 33/264 |
| 5,052,854 * | 10/1991 | Correa et al. | 404/94 |
| 5,388,048 | 2/1995 | Yavnayi et al. | 701/301 |
| 5,505,000 | 4/1996 | Cooke | 33/286 |
| 5,719,568 * | 2/1998 | Adams | 340/961 |

* cited by examiner

*Primary Examiner*—Benjamin C. Lee
(74) *Attorney, Agent, or Firm*—Adams, Schwartz & Evans, P.A.

(57) ABSTRACT

A vehicle guidance assembly visually indicates the anticipated path of a moving vehicle to a driver of the vehicle. The assembly includes an image projection device for projecting a visual image outwardly from the vehicle and downwardly onto a surface to be travelled by the vehicle. The image defines a reference mark on the surface for being readily viewed by the driver. A mounting member mounts the image projection device on a surface of the vehicle.

10 Claims, 8 Drawing Sheets

VEHICLE GUIDANCE ASSEMBLY AND METHOD

This is a continuation of application Ser. No. 09/165,980 filed Oct. 2, 1998 now abandoned.

TECHNICAL FIELD AND BACKGROUND OF THE INVENTION

This invention relates to a vehicle guidance assembly and method. The invention is especially applicable for use on large vehicles, such as tractor-trailers, buses, vans, RVs, and the like, to enhance the ability of the driver to maintain the vehicle on its proper course over a roadway. The invention creates visible reference marks on the road surface which clearly and distinctly define, for example, the outermost side edges of the vehicle.

One common problem recognized by drivers of trucks and other large vehicles is the ability to maintain the vehicle in the center of the lane, particularly at night and after several hours of constant driving. Many "long haul" truck drivers suffer mental fatigue and stress, and often drive tired putting their own safety and the safety of others on the road at risk. These drivers must constantly make split-second decisions concerning the actual and anticipated path of their vehicle. Driving a truck involves performing many complex sensory-motor tasks, and determining and making adjustments in lane position is one of the most critical. The present invention provides immediate and constant feedback of this critical information thereby reducing demands on the brain and fatigue levels. One small error in judgement by the driver can cost lives.

The present invention addresses the above and other problems by locating reference marks on the road surface which are readily visible by the driver and which are laterally spaced-apart a precise distance corresponding to the width of the vehicle. The reference marks indicate the anticipated path of the vehicle by showing the space through which the vehicle would travel were the driver to maintain the vehicle's present course. The path identified by the reference marks is further applicable for determining the instant position of the vehicle on the road surface. For example, if one reference mark falls outside of the driver's lane, the driver has sufficient opportunity to correct the path of the vehicle before heading off the road or encroaching upon the adjacent lane. In addition, a second set of reference marks may be located to the rear of the vehicle to assist the driver when moving in reverse.

SUMMARY OF THE INVENTION

Therefore, it is an object of the invention to provide a vehicle guidance assembly which utilizes an image projecting device, such as a laser module or other high-intensity light source, to project a visual image downwardly from the vehicle and outwardly onto the road surface for being readily viewed by the driver.

It is one object of the invention to provide a guidance assembly which continuously marks the width of a moving vehicle directly on the road surface such that the driver can readily determine the position of the vehicle without diverting his view.

It is another object of the invention to provide a guidance assembly which visually indicates the anticipated path of a moving vehicle.

It is another object of the invention to provide a guidance assembly which is particularly applicable for use on large vehicles, such as tractor-trailers, buses, RVs, and the like.

It is another object of the invention to provide a guidance system which will not disrupt the view of those traveling in oncoming vehicles.

It is another object of the invention to provide a guidance system which will automatically deactivate at a predetermined low speed of the vehicle.

It is another object of the invention to provide a guidance system which is operatively connected to the steering wheel of the vehicle, and which automatically adjusts the location of the reference mark on the road surface when the vehicle is turned.

It is another object of the invention to provide a guidance assembly which can be installed during or after manufacture of the vehicle.

It is another object of the invention to provide a guidance assembly which is relatively easy to manufacture and install.

It is another object of the invention to provide a guidance assembly which helps the driver guide the vehicle while moving in reverse.

It is another object of the invention to a guidance assembly which is applicable for use on farm equipment, snow plows, military vehicles including self-propelled combat equipment, air planes, boats, and the like.

It is another object of the invention to provide a guidance assembly which can be reset by the driver within the cab of the vehicle.

It is another object of the invention to provide a guidance assembly which is adapted for being attached to an object being towed by a vehicle.

It is another object of the invention to provide a guidance assembly which is usable during the day.

It is another object of the invention to provide a guidance assembly which identifies to the driver instant position of the vehicle on the road surface.

It is another object of the invention to provide a guidance assembly which is applicable for use on a forklift to determine the location of the forks relative to an item to be lifted.

It is another object of the invention to provide a guidance assembly which assists the driver when parking the vehicle.

It is another object of the invention to provide a guidance assembly which may be used to identify width of an object, such as a boat or trailer, being towed behind the vehicle.

It is another object of the invention to provide a method of guiding a vehicle on a road surface.

These and other objects of the present invention are achieved in the preferred embodiments disclosed below by providing a vehicle guidance assembly which visually indicates the anticipated path of a moving vehicle to a driver of the vehicle. The assembly includes an image projection device for projecting a visual image outwardly from the vehicle and downwardly onto a surface to be travelled by the vehicle. The image defines a reference mark on the surface for being readily viewed by the driver. Mounting means mounts the image projection device on a surface of the vehicle.

According to one preferred embodiment of the invention, the image projection device includes a laser module for emitting a beam in the direction of the surface to be travelled by the vehicle.

According to another preferred embodiment of the invention, the laser module includes a power cable for being electrically connected to a battery of the vehicle.

According to yet another preferred embodiment of the invention, an adjustable laser holder carries the laser module in a selected fixed position relative to the vehicle.

According to yet another preferred embodiment of the invention, the laser holder includes a swivel base for allowing swivel adjustment of the laser module relative to the vehicle.

According to yet another preferred embodiment of the invention, a protective housing covers the laser holder and the laser module, and includes a mounting plate for mounting said housing to the vehicle.

According to yet another preferred embodiment of the invention, the mounting plate includes a magnetic surface for cooperating with a metal surface of the vehicle to removably mount the housing to the vehicle.

According to yet another preferred embodiment of the invention, the protective housing includes a window arranged adjacent a beam-emitting end of the laser module.

According to yet another preferred embodiment of the invention, a moisture sensor determines the amount of moisture outside of the vehicle. An electrical interrupter is connected to the moisture sensor and to the image projection device for deactivating the image projection device upon sensing a predetermined amount of moisture.

According to yet another preferred embodiment of the invention, the electrical interrupter includes a ground fault interrupter.

According to yet another preferred embodiment of the invention, position sensing means is electrically connected to the image projection device for deactivating the image projection device when tilted upwardly beyond a predetermined angle.

According to yet another preferred embodiment of the invention, the position sensing means is a mercury switch.

According to yet another preferred embodiment of the invention, a speed sensor determines the speed of the moving vehicle. An electrical interrupter is connected to the speed sensor and to the image projection device for deactivating the image projection device when the vehicle reaches a predetermined speed.

According to yet another preferred embodiment of the invention, a switch sensor determines the state of an electrical switch connected to the vehicle. The switch sensor is electrically connected to the image projection device for activating and deactivating the image projection device based on the state of the electrical switch.

In another embodiment, the invention is a method for guiding a moving vehicle. The method includes the steps of projecting a visual image outwardly from the vehicle and downwardly onto a surface to be travelled by the vehicle. The image defines a reference mark on the surface for being readily viewed by the driver. The path of the moving vehicle is then adjusted depending on the location of the reference mark on the surface.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
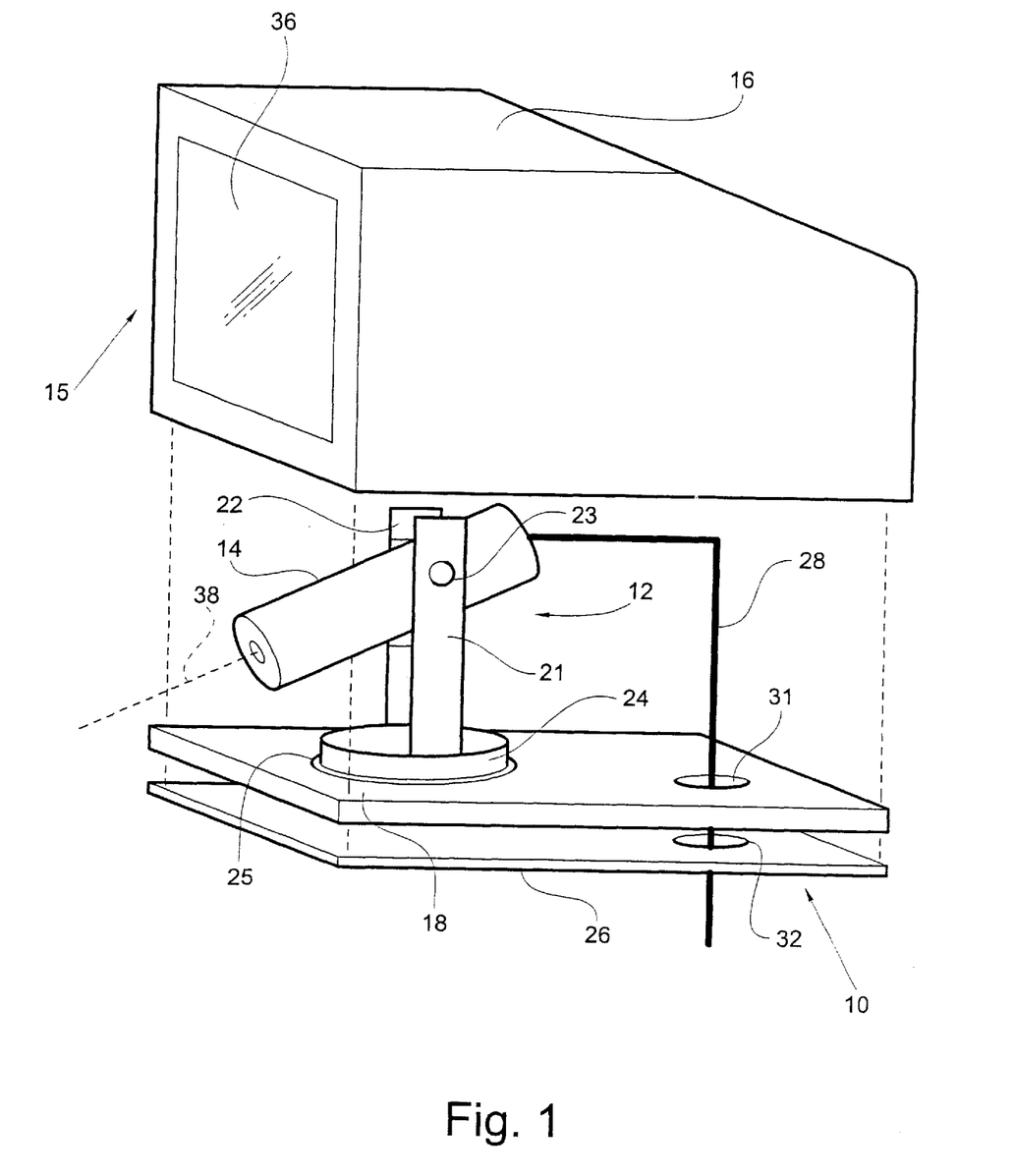
FIG. 1 is a perspective view of the vehicle guidance assembly according to one preferred embodiment of the invention with the cover removed to show the interior components of the assembly.

Referring now specifically to the drawings, a vehicle guidance assembly according to the present invention is illustrated in FIG. 1 and shown generally at reference numeral 10. The guidance assembly 10 is especially adapted for use on a vehicle 11, such as a tractor-trailer shown in FIGS. 2 and 3, to visually indicate to the driver the anticipated path of the vehicle 11 moving forward or in reverse. Preferably, the vehicle 11 includes at least two laterally spaced front assemblies 10 and two laterally spaced rear assemblies 10.

A single assembly 10 is described in detail below.

Figure 2:
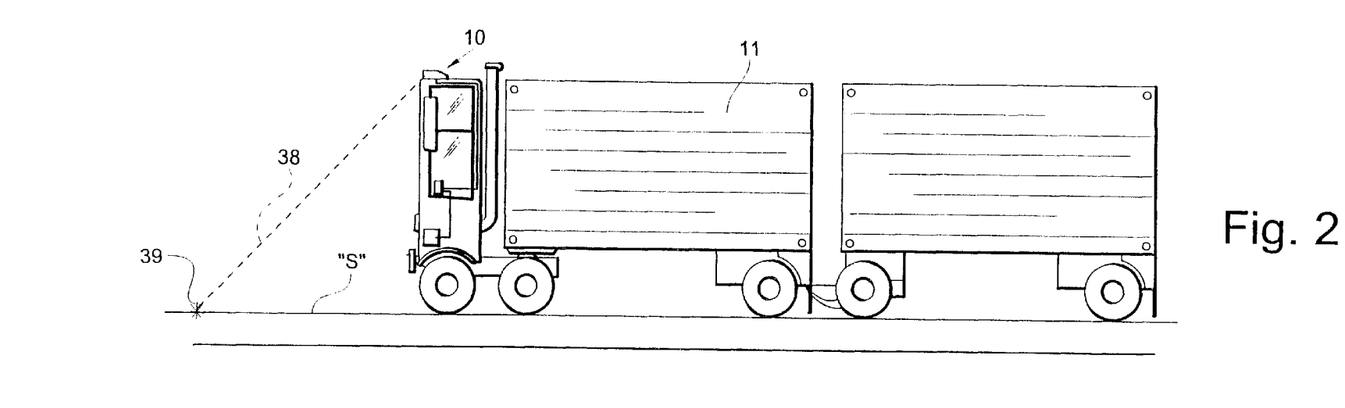
FIG. 2 is a side elevational view of a truck with the vehicle guidance assembly mounted on the roof of the cab.
Figure 3:
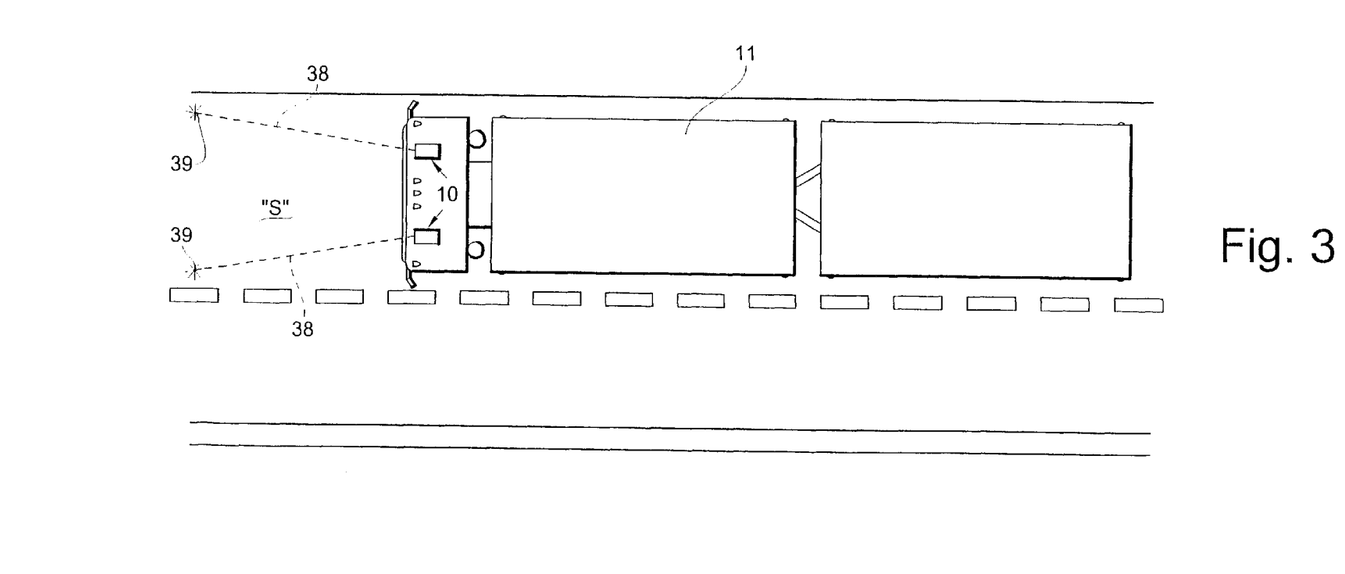
FIG. 3 is a top plan view of the truck showing two laterally-spaced vehicle guidance assemblies mounted on the roof of the cab.

Referring to FIGS. 1–3, the guidance assembly 10 includes an upstanding adjustable holder 12, a laser module 14 carried by the holder 12, and a protective housing 15 with a removable cover 16 and mounting plate 18. The holder 12 includes spaced vertical supports 21 and 22, a locking pivot pin 23, and an annular swivel base 24. The swivel base 24 is closely received within a complementary-shaped opening 25 formed in the mounting plate 18 of the housing 15. Friction between engaging surfaces of the swivel base 24 and mounting plate 18 is sufficient to hold the laser module 14 in position during operation of the vehicle 11, while allowing manual swivel adjustment of the holder 12 to set the laser module 14. The opening 25 may include an annular, inwardly-extending lip (not shown) which engages the outer perimeter of the base 24 to further secure the holder 12 to the mounting plate 18. Alternatively, the holder 12 is welded directly to the mounting plate 18 or otherwise permanently attached using suitable fasteners. The locking pin 23 allows upward and downward pivot adjustment of the laser module 14.

The guidance assembly 10 is mounted on the hood, roof, or bumper of the vehicle 11 at locations allowing the laser module 14 to emit a beam outwardly and downwardly in the direction of the road surface "S". A rubber gasket 26 is preferably positioned between the mounting plate 18 and vehicle 11 to create a seal preventing water from entering the housing 15 and damaging the laser module 14 during operation of the vehicle 11. The gasket 26 is adhered to the mounting plate 18 and vehicle 11 using any suitable adhesive, screws, or other fastener means. An electrical power cable 28 extends from the laser module through openings 31 and 32 formed in the mounting plate 18 and gasket 26, respectively, and into the interior of the vehicle 11. The cable 28 connects to a manual "on/off" switch 34 located near the driver and electrically connected to the vehicle battery 35, as indicated in FIG. 2. The battery 35 provides sufficient current to operate the laser module 14. According to one embodiment, the cable 28 is adapted to plug directly into the vehicle's cigarette outlet. Alternatively, the laser module 14 may be hard-wired into the vehicle's fuse box so that it activates when the lights or other electrical accessory are turned-on.

Once mounted to the vehicle 11, the cover 16 is snap-fit onto the mounting plate 18 of the housing 15. Window 36 allows the beam 38 generated by the laser module 14 to pass outwardly through the housing 15 and downwardly onto the road surface "S". The window 36 may be formed of a flat piece of glass, plastic, or any other clear or tinted material. The cover 16 is readily removed for allowing swivel adjustment of the laser holder 12 and pivot adjustment of the module 14.

The beam 38 generated by the laser module 14 creates a visual reference mark 39 on the road surface "S". The reference mark 39 is preferably in the form of a red dot about 2–3 cm in diameter or a thin red line about 15 cm long. In one application, the laser module 14 is aligned to locate the reference mark 39 about 10–12 feet in front of the vehicle 11 and at a point corresponding to a left or right outer edge of the vehicle 11. As shown in FIG. 3, a pair of assemblies 10 are mounted on the roof of the vehicle 11 and aligned accordingly to visually indicate the width of the vehicle 11, and the anticipated path of the vehicle 11 if it were to maintain its present course. The driver knows immediately whether the vehicle 11 is headed in a direction off the road or into someone else's lane, and has sufficient time to take corrective steering measures. In addition, a second pair of assemblies (not shown) may be located at the rear of the vehicle 11 to create reference marks 39 on the road surface "S" visible to the driver through the side view mirror. The rear assemblies would assist and guide the driver when moving the vehicle 11 in reverse.

Figure 4:
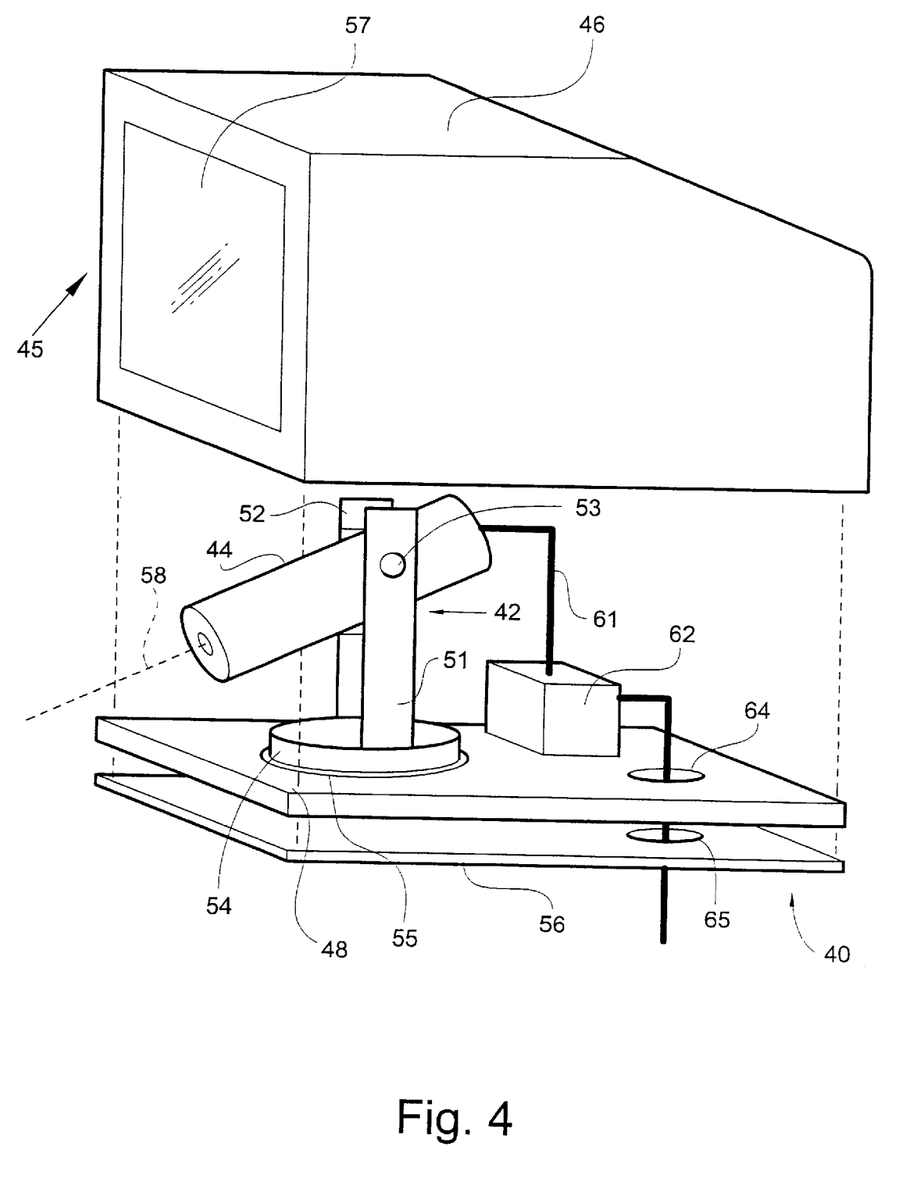
FIG. 4 is a perspective view of the vehicle guidance assembly according to a second preferred embodiment of the invention with the cover removed to show the interior components of the assembly.
Figure 5:
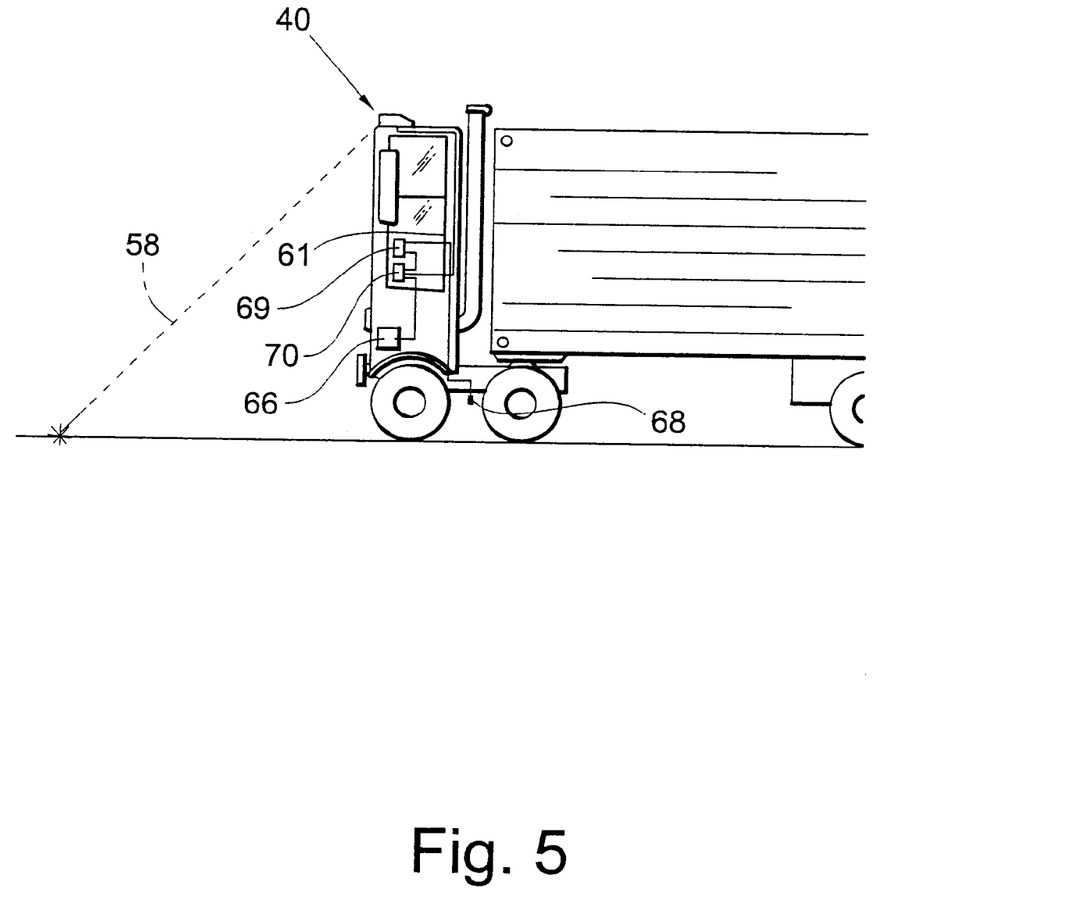
FIG. 5 is a fragmentary side elevational view of the truck with the vehicle guidance assembly mounted on the roof of the cab.

A second embodiment of the guidance assembly 40 is shown in FIGS. 4 and 5. As previously described, the guidance assembly 40 includes an upstanding adjustable holder 42, a laser module 44 carried by the holder 42, and a protective housing 45 with a removable cover 46 and mounting plate 48. The holder 42 includes spaced vertical supports 51 and 52, a locking pivot pin 53, and an annular swivel base 54. The swivel base 54 is closely received within a complementary-shaped opening 55 formed in the mounting plate 48 of the housing 45. A rubber gasket 56 is positioned between the mounting plate 48 and vehicle 11 to create a seal preventing water from entering the housing 45 and damaging the laser module 44 during operation of the vehicle 11. The cover 46 has a window 57 for allowing passage of the laser beam 58 from the laser module 44 through the housing 45 and downwardly onto the road surface "S".

The electrical power cable 61 is connected to the laser module 44 and a ground-fault interrupter 62, and extends through aligned openings 64 and 65 in the mounting plate 48 and gasket 56 to the vehicle battery 66. The ground-fault interrupter 62 is electrically connected by cable 61 to a moisture sensor 68 and a ground-fault reset button 69 conveniently located inside the cab of the vehicle 11. The moisture sensor 68 is located outside the vehicle 11 and near the tires so that it readily detects any rain, snow, or other moisture present on the road surface. When moisture contacts the sensor 68, the ground-fault interrupter 62 causes the laser module 44 to deactivate, thereby reducing the likelihood of the beam 58 reflecting off of the wet road surface "S" and into the view of oncoming drivers. When the moisture sensor 68 has sufficiently dried, the driver presses the ground-fault reset button 69 to reset the ground-fault interrupter 62 and restore power to the laser module 44. An on/off switch 70 is preferably located within the cab of the vehicle 11 to allow manual override of the moisture sensor 68.

Figure 6:
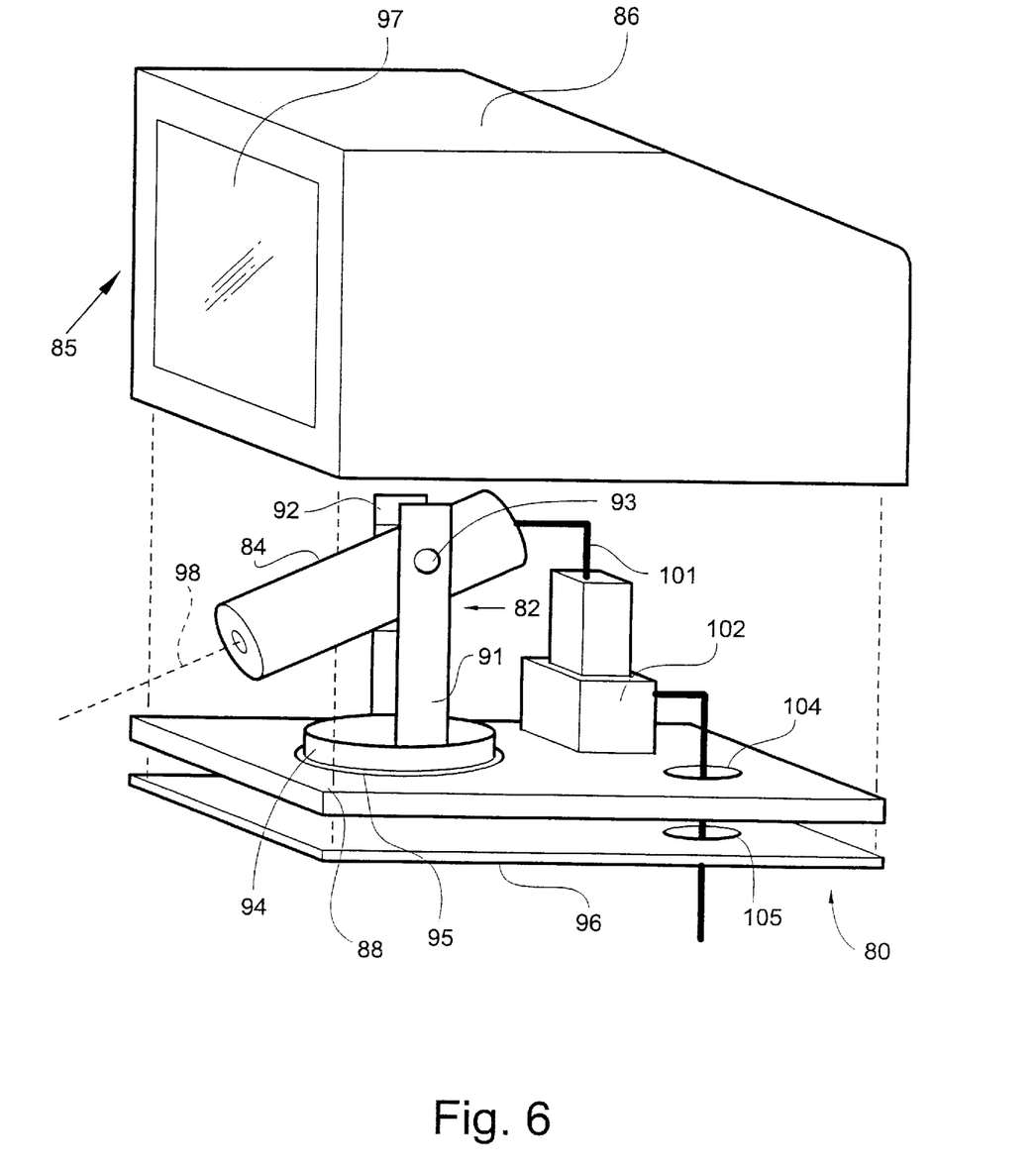
FIG. 6 is a perspective view of the vehicle guidance assembly according to a third preferred embodiment of the invention with the cover removed to show the interior components of the assembly.

A third embodiment of the guidance assembly 80 is shown in FIG. 6. The guidance assembly includes an upstanding adjustable holder 82, a laser module 84 carried by the holder 82, and a protective housing 85 with a removable cover 86 and mounting plate 88. The holder 82 includes spaced vertical supports 91 and 92, a locking pivot pin 93, and an annular swivel base 94. The swivel base 94 is closely received within a complementary-shaped opening 95 formed in the mounting plate 88 of the housing 85. A rubber gasket 96 is positioned between the mounting plate 88 and vehicle to create a seal preventing water from entering the housing 85 and damaging the laser module 84 during operation of the vehicle. The cover 86 has a window 97 which allows passage of the laser beam 98 from the laser module 84 outwardly through the housing 85 and downwardly onto the road surface.

The power cable 101 is electrically connected to the laser module 84 and a mercury switch 102, and extends through aligned openings 104 and 105 in the mounting plate 88 and gasket 96 to the vehicle battery. The mercury switch 102 functions to shut off power to the laser module 84 when the module 84 is tilted upwardly beyond a predetermined angle. The mercury switch 102 is a further safety feature which prevents the laser beam 98 from being inadvertently directed upwardly and into the eyes of oncoming drivers. When the mercury switch 102 is triggered, power to the laser module 84 is shut off and remains off until the module 84 is readjusted downwardly towards the road surface "S".

Figure 7:
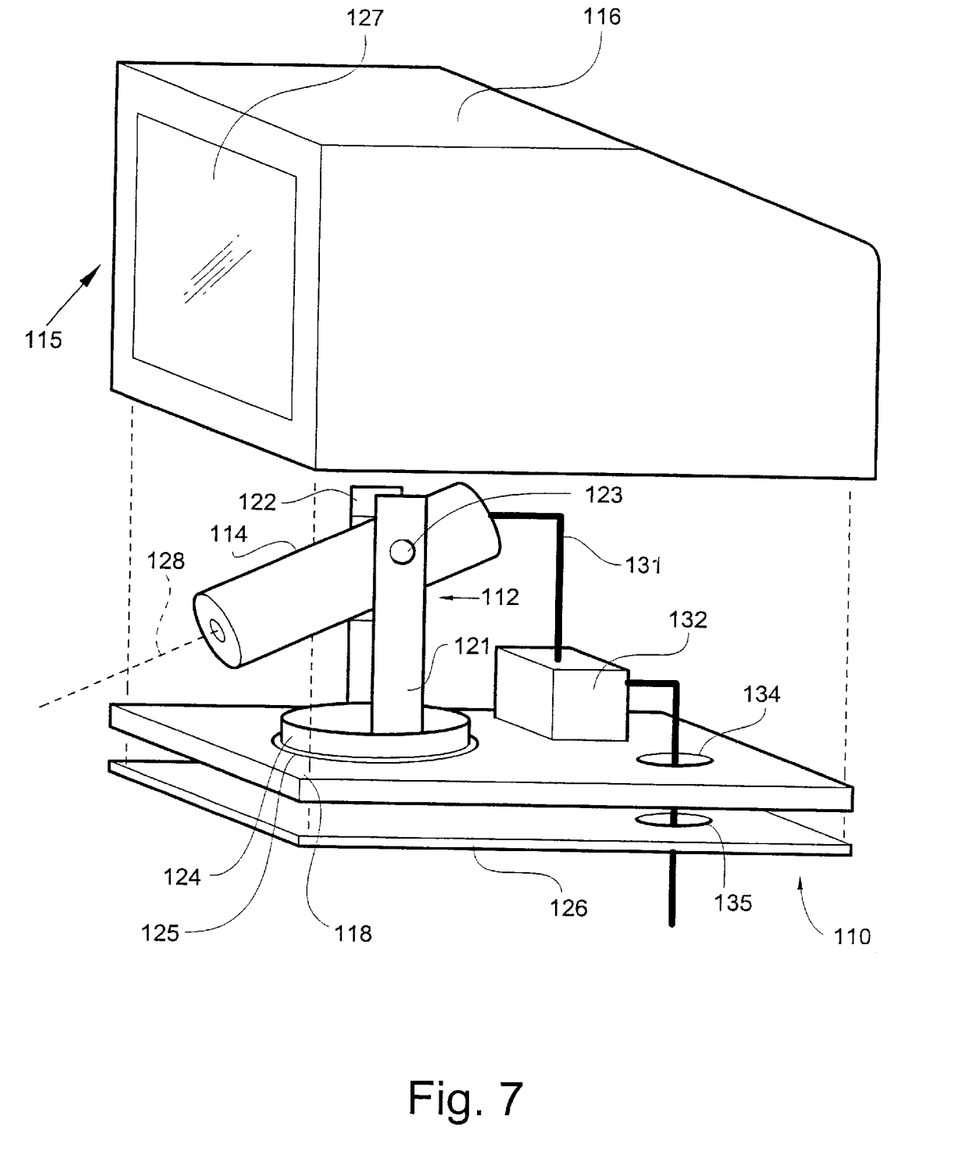
FIG. 7 is a perspective view of the vehicle guidance assembly according to a fourth preferred embodiment of the invention with the cover removed to show the interior components of the assembly.
Figure 8:
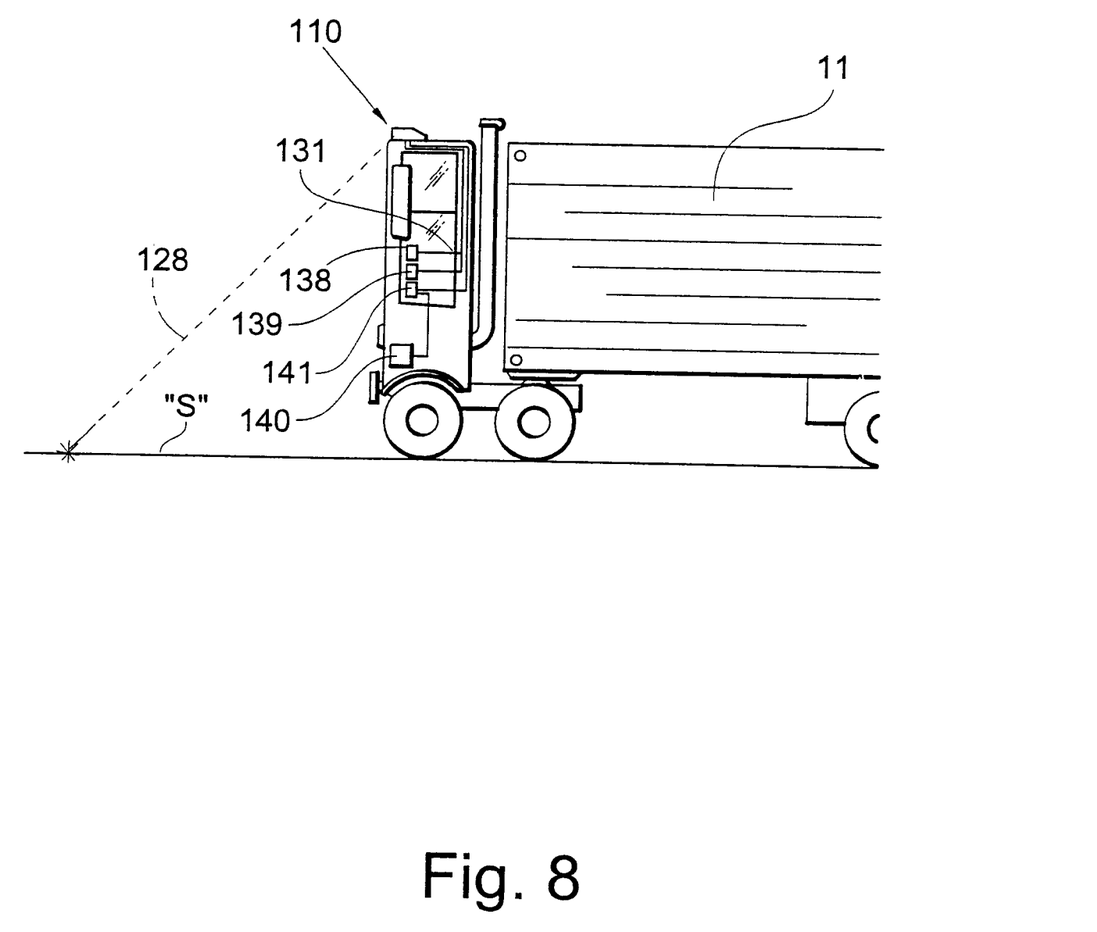
FIG. 8 is a fragmentary side elevational view of the truck with the vehicle guidance assembly mounted on the roof of the cab.

A fourth embodiment of the guidance assembly 110 is shown in FIGS. 7 and 8. The guidance assembly 110 includes an upstanding adjustable holder 112, a laser module 114 carried by the holder 112, and a protective housing 115 with a removable cover 116 and mounting plate 118. The holder 112 includes spaced vertical supports 121 and 122, a locking pivot pin 123, and an annular swivel base 124. The swivel base 124 is closely received within a complementary-shaped opening 125 formed in the mounting plate 118 of the housing 115. A rubber gasket 126 is positioned between the mounting plate 118 and vehicle 11 to create a seal preventing water from entering the housing 115 and damaging the laser module 114 during operation of the vehicle 11. The cover 116 has a window 127 for allowing passage of the laser beam 128 from the laser module 114 outwardly through the housing 115 and downwardly onto the road surface "S".

The power cable 131 is electrically connected the laser module 114 and an electrical interrupter 132, and extends through aligned openings 134 and 135 formed in the mounting plate 118 and gasket 126, respectively, to a speed sensor 138, switch sensor 139, and vehicle battery 140. The speed sensor 138 is connected to the speedometer of the vehicle 11. When the vehicle speed reaches a predetermined low, the speed sensor 138 relays a signal to the electrical interrupter 132 which shuts off power to laser module 114. This embodiment is particularly applicable for use on school buses. When the school bus begins to slow down to pick up or let off children, the guidance assembly 110 deactivates so that children can safely pass in front of the bus without walking through the laser beam 128.

The switch sensor 139 is electrically connected to the interrupter 132 and to one or more predetermined electrical accessories in the vehicle 11. The switch sensor 139 determines when the connected accessory is turned on or off and sends this information to the electrical interrupter 132. The interrupter 132 shuts off power to the laser module 114. For school buses, the switch sensor 139 may be connected to the red flashing lights which signal that the bus is stopping. When the lights are turned on, the switch sensor 139 sends a signal to electrical interrupter 132 which shuts off the power to laser module 114. The power is kept off until the flashing lights are turned off and the bus is moving again. This also keeps children from walking through laser beam. An on/off switch 141 is preferably located within the cab of the vehicle 11 to allow manual override of the speed sensor 138 and switch sensor 139.

Figure 9:
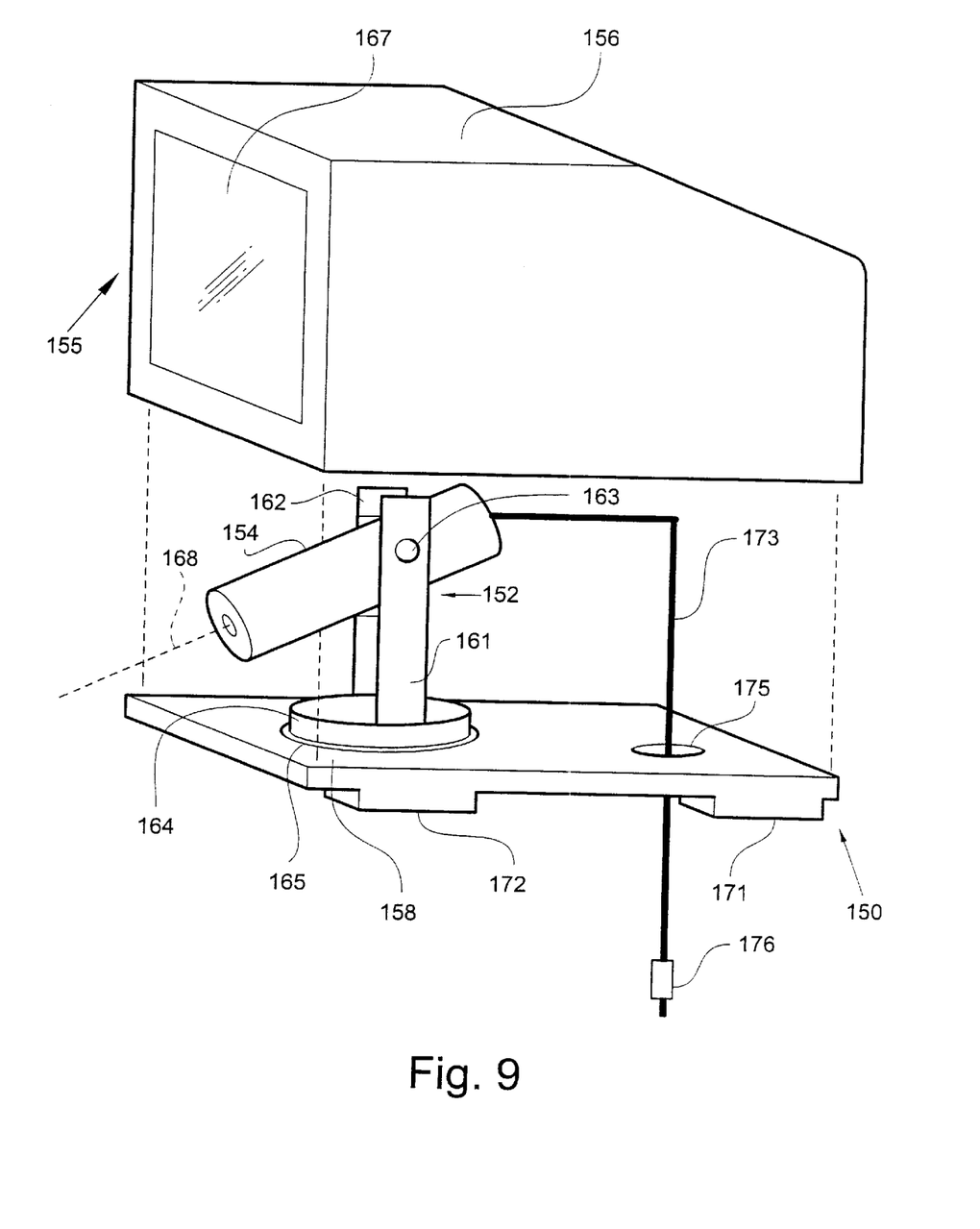
FIG. 9 is a perspective view of the vehicle guidance assembly according to a fifth preferred embodiment of the invention with the cover removed to show the interior components of the assembly.

A fifth embodiment of the guidance assembly 150 is shown in FIG. 9. The guidance assembly 150 includes an upstanding adjustable holder 152, a laser module 154 carried by the holder 152, and a protective housing 155 with a removable cover 156 and mounting plate 158. The holder 152 includes spaced vertical supports 161 and 162, a locking pivot pin 163, and an annular swivel base 164. The swivel base 164 is closely received within a complementary-shaped opening 165 formed in the mounting plate 158 of the housing 155. The cover 156 has a window 167 for allowing passage of the laser beam 168 from the laser module 154 outwardly through the housing 155 and downwardly onto the road surface.

Magnets 171 and 172 are attached to the underside of the mounting plate 158 to mount the assembly 150 to a metal surface of the vehicle. The power cable 173 extends from the laser module 154 through an opening 175 in the mounting plate 158 and terminates at a male connecting end 176. The connecting end 176 is adapted for being inserted into the vehicle's cigarette lighter socket. According to this embodiment, the guidance assembly 150 is easily moveable in a matter of minutes and interchangeable among several vehicles. Each time guidance assembly 150 is moved, the laser holder 154 must be readjusted so that the reference mark created by laser beam 168 hits the road surface at the appropriate location.

In another embodiment (not shown), the guidance assembly is operatively connected to the steering wheel of the vehicle, such that the reference mark created by the laser module on the road surface automatically shifts when the steering wheel is turned to visually indicate the anticipated path of the vehicle through a curve. Additional safety features can also be added to the guidance assembly to insure its safe operation. In all embodiments, the components can be interchanged according to the needs and desires of the vehicle owner.

The guidance assembly may also be mounted to the side view mirror using suitable brackets, such that the laser module can be readily adjusted by the driver without leaving the cab of the vehicle. The power cord extends from the laser module into the cab of the vehicle and plugs into the cigarette lighter socket. Alternatively, the guidance assembly may be mounted on the roof of the vehicle cab, as described above, and may include a handle attached to the laser module and extending inside the cab for allowing convenient adjustment of the laser module. In addition, special tinted glasses may be worn by the driver in order to clearly identify the reference marks during the day.

A vehicle guidance assembly and method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A method of reducing driver fatigue resulting from a cognitive task involving lane tracking of a moving vehicle within predetermined bounds of a vehicle traveling lane defined by lane markers on a road surface, said method comprising the step of projecting a visual image outwardly from the moving vehicle and downwardly onto the road surface, the projected image defining a reference mark on the road surface for being readily viewed by the driver and indicating to the driver a position of the moving vehicle relative to the predetermined bounds of the vehicle traveling lane, thereby reducing the cognitive workload of processing sensory information required of the driver for maintaining the vehicle within the predetermined bounds of the vehicle travel lane.

2. A method of reducing driver fatigue according to claim 1, and comprising the step of aligning the reference mark on the road surface relative to a point on the vehicle.

3. A method of reducing driver fatigue according to claim 1, and comprising the step of aligning the reference mark on the road surface relative to an outermost point located along a side of the vehicle.

4. A method of reducing driver fatigue according to claim 1, and comprising the step of projecting two visual images outwardly from the moving vehicle and downwardly onto the road surface, the projected images defining respective reference marks on the road surface for being readily viewed by the driver.

5. A method of reducing driver fatigue according to claim 4, and comprising the step of aligning the two reference marks on the road surface relative to two separate points on the vehicle.

6. A method of reducing driver fatigue according to claim 4, and comprising the step of aligning the two reference marks on the road surface relative to two outermost points located along respective opposing sides of the vehicle and indicating a maximum lateral dimension of the vehicle.

7. A vehicle guidance assembly for visually indicating the anticipated path of a moving vehicle to a driver of the vehicle, said assembly comprising:

(a) an image projection device for projecting a visual image outwardly from the vehicle and downwardly onto a surface to be traveled by the vehicle, said image defining a reference mark on the surface for being readily viewed by the driver; and (b) mounting means for mounting said image projection device on the vehicle; and (c) position sensing means electrically connected to said image projection device for deactivating said image projection device when tilted upwardly beyond a predetermined angle.

8. In combination with a vehicle, a vehicle guidance assembly for visually indicating the anticipated path of vehicle when moving to a driver of the vehicle, said assembly comprising:

(a) an image projection device for projecting a visual image outwardly from the vehicle and downwardly onto a surface to be traveled by the vehicle, said image defining a reference mark on the surface for being readily viewed by the driver; and (b) mounting means for mounting said image projection device on the vehicle; and (c) position sensing means electrically connected to said image projection device for deactivating said image projection device when tilted upwardly beyond a predetermined angle.

9. A vehicle guidance assembly for visually indicating the anticipated path of a moving vehicle to a driver of the vehicle, said assembly comprising:

(a) an image projection device for projecting a visual image outwardly from the vehicle and downwardly onto a surface to be traveled by the vehicle, said image defining a reference mark on the surface for being readily viewed by the driver;

(b) mounting means for mounting said image projection device on the vehicle; and (c) a moisture sensor for determining the amount of moisture outside of the vehicle, and an electrical interrupter connected to said moisture sensor and to said image projection device for deactivating said image projection device upon sensing a predetermined amount of moisture.

10. A vehicle guidance assembly for visually indicating the anticipated path of a moving vehicle to a driver of the vehicle, said assembly comprising:

(a) an image projection device for projecting a visual image outwardly from the vehicle and downwardly onto a surface to be traveled by the vehicle, said image defining a reference mark on the surface for being readily viewed by the driver;

(b) mounting means for mounting said image projection device on the vehicle; and (c) a speed sensor for determining the speed of the moving vehicle, and an electrical interrupter connected to said speed sensor and to said image projection device for deactivating said image projection device when the vehicle reaches a predetermined speed.

* * * * *